(12) United States Patent
Glenn

(10) Patent No.: US 7,110,020 B2
(45) Date of Patent: Sep. 19, 2006

(54) FILM DIGITIZER

(75) Inventor: William E. Glenn, Ft. Lauderdale, FL (US)

(73) Assignee: Florida Atlantic University, Boca Raton, FL (US)

( * ) Notice: Subject to any disclaimer, the term of this patent is extended or adjusted under 35 U.S.C. 154(b) by 16 days.

(21) Appl. No.: 10/690,494

(22) Filed: Oct. 21, 2003

(65) Prior Publication Data

US 2004/0135893 A1 Jul. 15, 2004

Related U.S. Application Data

(60) Provisional application No. 60/420,066, filed on Oct. 21, 2002.

(51) Int. Cl.
*H04N 9/11* (2006.01)
(52) U.S. Cl. ............. 348/97; 348/96; 348/209.99; 348/335; 348/342; 348/362; 348/363
(58) Field of Classification Search ............ 348/84–87, 348/96, 97, 209.99, 335, 342–344, 362–363
See application file for complete search history.

(56) References Cited

U.S. PATENT DOCUMENTS

| | | | | | |
|---|---|---|---|---|---|
| 4,614,415 A | * | 9/1986 | Hyatt | ............. | 345/84 |
| 4,720,637 A | * | 1/1988 | Clark | ............. | 348/340 |
| 5,140,428 A | * | 8/1992 | Park | ............. | 348/766 |
| 5,424,802 A | * | 6/1995 | Saita | ............. | 355/43 |
| 5,457,491 A | * | 10/1995 | Mowry | ............. | 348/104 |
| 5,805,274 A | * | 9/1998 | Saita | ............. | 355/38 |
| 5,833,341 A | * | 11/1998 | Kimura et al. | ............. | 353/98 |
| 6,091,445 A | * | 7/2000 | Matsui et al. | ............. | 348/96 |
| 6,219,092 B1 | * | 4/2001 | Saito | ............. | 348/96 |
| 6,222,650 B1 | * | 4/2001 | Long | ............. | 359/2 |
| 6,366,708 B1 | * | 4/2002 | Steinebach | ............. | 382/312 |

* cited by examiner

Primary Examiner—Tuan Ho
Assistant Examiner—Chriss S. Yoder
(74) Attorney, Agent, or Firm—Martin Novack

(57) ABSTRACT

A method for producing electronic signals representative of images on a source film includes the following steps: illuminating the film with a light source to obtain an illuminated frame; providing an electronic image sensor; providing a lens array for projecting the illuminated frame on the electronic image sensor, and providing an aperture in conjunction with the lens array for high spatial frequency cutoff in the image; and reading out image representative electronic signals from the electronic image sensor.

72 Claims, 3 Drawing Sheets

FILM DIGITIZER

RELATED APPLICATION

Priority is claimed from U.S. Provisional Patent Application No. 60/420,066, filed Oct. 21, 2002, and said Provisional Application is incorporated herein by reference.

FIELD OF INVENTION

This invention relates to a method and apparatus for producing electronic signals representative of images on a source film, and also to recording, on an object film, images represented by electronic signals. The technique and apparatus can be used for digitizing motion picture film and making release prints from processed digital information.

BACKGROUND OF THE INVENTION

Eventually the cinema may become an all electronic system. Until that time, it is likely that programs will be shot on film, processed digitally, and then scanned back onto film for distribution to theaters. Scanning the film, digitizing the signal, and later scanning back onto film is now done with laser scanners. These are very expensive and slow. They typically take several seconds per frame for the scanning process. In addition to this speed problem, there is a need for an optical pre and post filter in the process. The film grain beats with the scanning pattern producing alias spatial frequencies that are more visible than the original grain. When scanning back onto film there is normally a visible pixel structure. This can make the image look like it has screen wire superimposed on the image.

It is among the objects of the present invention to provide improved techniques and apparatus for producing electronic signals representative of images on a source film, and also for recording, on an object film, images represented by electronic signals.

SUMMARY OF THE INVENTION

In a form of the present invention, a lens system is used for imaging a source film on an electronic image sensor to obtain electronic signals representative of images on the source film. These signals are stored and subsequently used for recording, on an object film, images represented by the electronic signals, the latter process involving imaging light through an electro-optical panel onto an object film. For both parts of the process, optical filtering is employed to advantage. It limits image detail near the spatial frequency of the scanning pattern and has a sharp cutoff to prevent undue reduction in the image detail. In the preferred embodiments hereof, an aperture, which may be adjustable, is used for optical filtering with sharp cutoff that is easily adjustable to determine optimum performance.

In accordance with a form of the invention, a method is set forth for producing electronic signals representative of images on a source film, comprising the following steps: illuminating the film with a light source to obtain an illuminated frame; providing an electronic image sensor; providing a lens array for projecting the illuminated frame on the electronic image sensor, and providing an aperture in conjunction with the lens array for high spatial frequency cutoff in the image; and reading out image representative electronic signals from the electronic image sensor.

In an embodiment of this form of the invention, the light source is focused at the plane of the aperture, and this focusing is implemented with a field lens. The image of the light source is preferably less than one-fifth the size of the aperture. Also in this embodiment, the step of providing an aperture comprises providing an aperture having a high frequency cutoff in the range 0.7 to 1.4 times the Nyquist limit for the pixel spacing of the image sensor.

In accordance with a further form of the invention, a method is set forth for recording, on an object film, images represented by electronic signals, comprising the following steps: providing a light source; providing an electro-optical medium that receives image-representative electronic signals and also receives input light from the light source, and produces output light containing the image represented by the electronic signals; and providing a lens array for projecting the output light onto the object film, and providing an aperture in conjunction with the lens array for high spatial frequency cutoff in the image.

In an embodiment of this further form of the invention, the step of providing an electro-optical medium comprises providing an electro-optical panel. Also in this embodiment, the light source is focused at the plane of the aperture by a field lens, and the image of the light source is preferably less than one-fifth the size of the aperture. Also in this embodiment, the step of providing an aperture comprises providing an aperture having a high frequency cutoff in the range 0.7 to 1.4 times the Nyquist limit for the pixel spacing of the electro-optical panel.

Further features and advantages of the invention will become more readily apparent from the following detailed description when taken in conjunction with the accompanying drawings.

DETAILED DESCRIPTION

Figure 1:
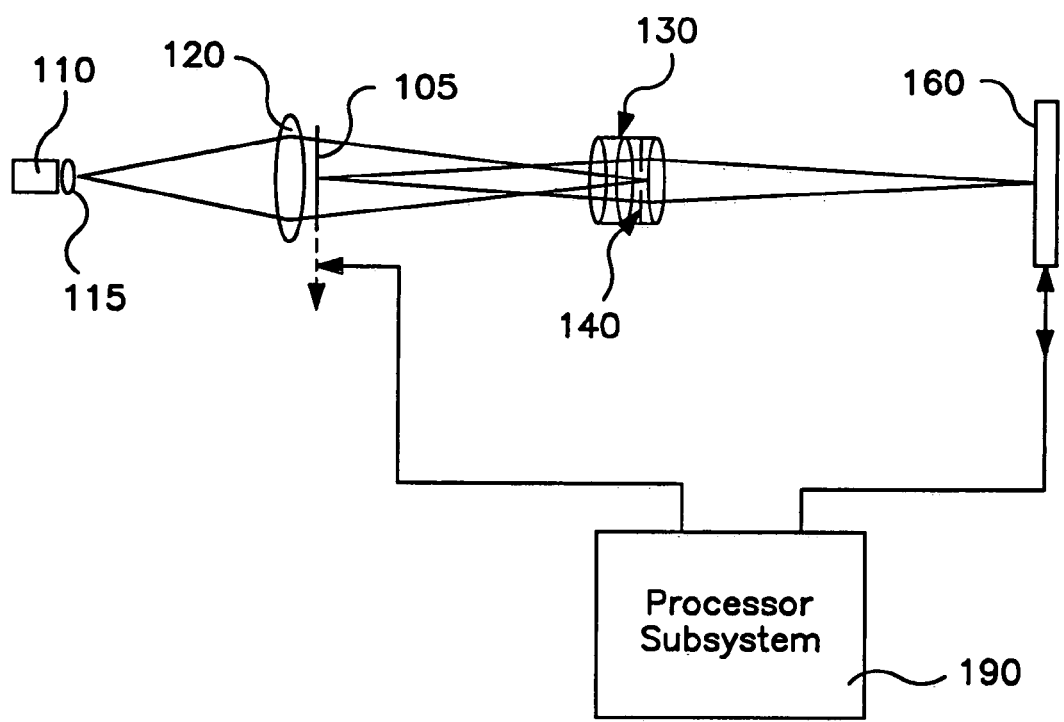
FIG. 1 is a diagram, partially in block form, of an apparatus in accordance with an embodiment of the invention and which can be used in practicing an embodiment of a method of the invention, for producing electronic signals representative of images on a source film.

In FIG. 1, a laser beam from a laser 110 is expanded by a beam expander 115 and directed onto the source film 105 via a field lens 120. [Throughout, it will be understood that optical components are generically represented, and that one or more lenses can be employed for each element shown, as appropriate, regardless of the particular simplified representation used in the drawings.] A frame of the source film is illuminated in this embodiment. A copy lens array, represented at 130, projects the image onto an electronic image sensor 160. An aperture 140, which may be an adjustable aperture, is provided in conjunction with the lens array 130. The output of the sensor 160, which may be, for example, a CCD sensor, or any other suitable sensor, is coupled with processor subsystem 190, which includes memory, clocking, input/output functions, and other known features (all, not separately shown) for storage of the signal and any electronic processing thereof that is desired. The processor is preferably a digital processor. If the signals read out of the sensor are not in digital form, they can be converted to digital form. The processor subsystem 190 controls the frame pull-down and the reading out of signals from the electronic image sensor. Color can be produced frame-sequentially with, for example, red, green, and blue light sources.

Figure 2:
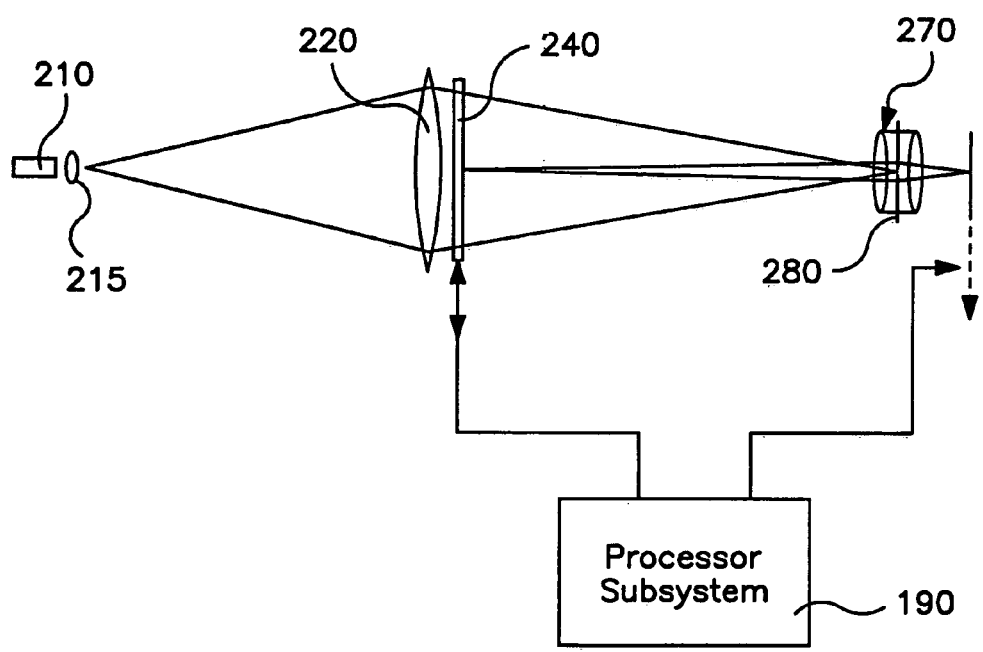
FIG. 2 is a diagram, partially in block form, of an apparatus in accordance with an embodiment of the invention and which can be used in practicing an embodiment of a method of the invention, for recording, on an object film, images represented by electronic signals.

In FIG. 2, there is shown a diagram of an embodiment of a system for recording on an object film (290), for example a negative for producing "release prints" for use in a movie theater, using the previously stored image information. In the FIG. 2 embodiment, a laser beam from laser 210 is expanded by beam expander 215, and projected, via field lens 220, onto an electro-optical panel 240. The panel 240 may be, for example, a liquid crystal panel, or any other suitable type of panel that can produce an image pattern for illumination by the light source as shown. [The present embodiment utilizes a transmissive electro-optical panel, although it will be understood that other media, such as a reflective light valve modulator, could also be used.] The panel 240 receives electronic information from processor subsystem 190 which, again, is preferably a digital processor, suitably equipped. This image is projected onto film 290 by a lens array 270, which is a camera lens array in the present embodiment. An aperture 280, which may be an adjustable aperture, is provided in conjunction with the lens array 270. Again, color can be produced frame-sequentially with red, green and blue light sources.

An optical pre-filter, implemented by aperture 140 in FIG. 1, is needed to limit the image detail near the spatial frequency of the scanning pattern. This needs to have a sharp cut-off to prevent it from reducing the detail in the image. The screen wire artifact can be eliminated with an optical post-filter, implemented by the aperture 280 in FIG. 2, that has a sharp cut-off that filters out the information above the Nyquist limit.

For the digitizing process, a fourth exposure can be made with infra-red light. The film dyes are transparent to IR, so that this exposure shows only scratches and dirt. The scratch and dirt information can be used in the processing with known error concealment techniques to clean up the image.

Figure 3:
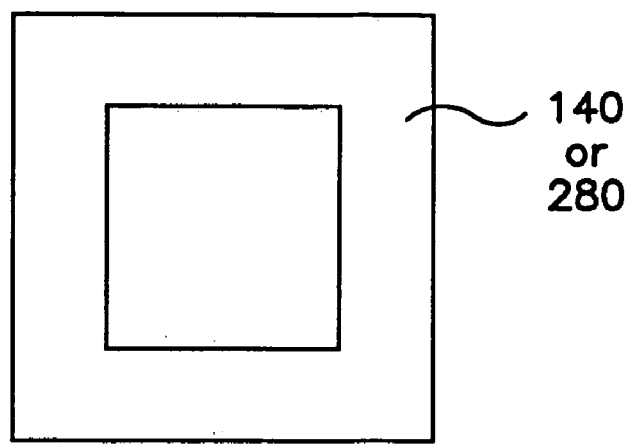
FIGS. 3, 4 and 5 show aperture shapes used in embodiments of the invention.
Figure 4:
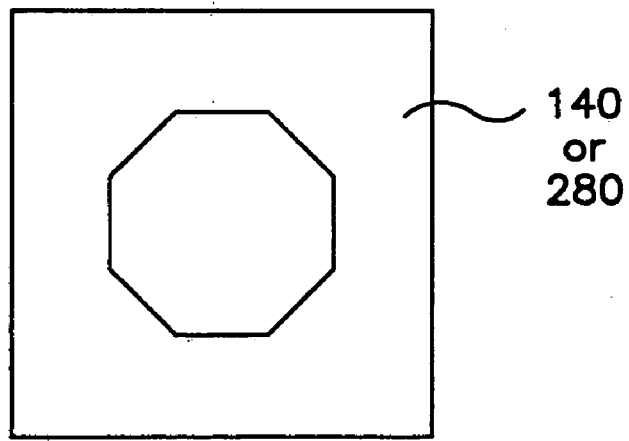
Figure 5:
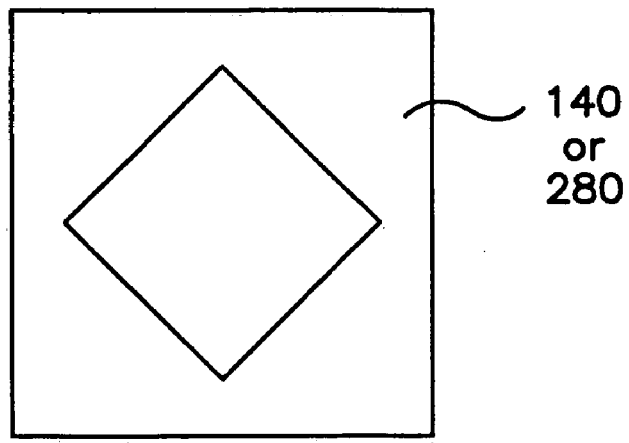

As seen in FIG. 1 and FIG. 2, a field lens (120 or 220) is used in both cases to image a point light source in the beam expander onto the lens aperture (140 or 280). The light distribution in the plane of the lens aperture is the two-dimensional Fourier transform of the spatial frequencies in the image. The spatial frequencies increase radially around the central focal spot. Changing the lens aperture changes the high frequency cut-off of the information imaged by the lens. For a light source that is small compared to the aperture size (preferably, less than one-fifth the aperture size) the cut-off is very sharp. For the pre-filtering process the aperture is closed down until the alias frequencies from the film grain are removed. The ideal size is to have a cut-off about 1.3 (or, more generally, 0.7 to 1.4) times the Nyquist limit of the pixel spacing. For scanning back onto film, the aperture 270 is used to cut out the scanning spatial frequencies and their harmonics. This filters out the scanning structure, leaving only the image information. The aperture shape preferably matches to the pixel pattern. Typically, this will be square (a specific case of rectangular), hexagonal, or of diamond shape (as for diagonal sampling). FIGS. 3, 4, and 5 respectively illustrate square, hexagonal, and diamond-shaped apertures 140 or 280.

The invention claimed is:

1. A method for producing electronic signals representative of images on a source film, comprising the steps of:

illuminating said film with a light source to obtain an illuminated frame;

providing an electronic image sensor;

providing a lens array for projecting said illuminated frame on said electronic image sensor, and providing an aperture in conjunction with said lens array for high spatial frequency cutoff in the image;

reading out image representative electronic signals from said electronic image sensor; and closing down the aperture until alias frequencies from the film grain are removed.

2. The method as defined by claim 1, further comprising focusing the image of the light source at the plane of said aperture, said image of the light source being less than one-fifth the size of said aperture.

3. The method as defined by claim 2, wherein said focusing step comprises focusing with a field lens. of providing an aperture comprises providing an aperture having a shape matched to the pixel pattern of said image sensor.

4. The method as defined by claim 3, wherein said step of providing an aperture comprises providing an aperture having a high frequency cutoff in the range 0.7 to 1.4 times the Nyquist limit for the pixel spacing of said image sensor.

5. The method as defined by claim 4, further including recording, on an object film, images represented by said electronic signals, said recording including the steps of:

providing a further light source;

providing an electro-optical medium that receives image-representative electronic signals and also receives input light from the further light source, and produces output light containing the image represented by said electronic signals;

providing a lens array for projecting said output light onto said object film, and providing a further aperture in conjunction with said lens array for high spatial frequency cutoff in the image.

6. The method as defined by claim 2, wherein said step of providing an aperture comprises providing a rectangular aperture.

7. The method as defined by claim 2, wherein said step of providing an aperture comprising providing a square aperture.

8. The method as defined by claim 2, wherein said step of providing an aperture comprises providing a hexagonal aperture.

9. The method as defined by claim 2, wherein said step of providing an aperture comprises providing a diamond shaped aperture.

10. The method as defined by claim 2, wherein said step of providing an aperture comprises providing an aperture having a high frequency cutoff in the range 0.7 to 1.4 times the Nyquist limit for the pixel spacing of said image sensor.

11. The method as defined by claim 2, further comprising the step of storing said image-representative signals as digital signals.

12. The method as defined by claim 1, wherein said step of providing an aperture comprises providing an aperture having a shape matched to the pixel pattern of said image sensor.

13. The method as defined by claim 12, wherein said step of providing an aperture comprises providing an aperture having a high frequency cutoff in the range 0.7 to 1.4 times the Nyquist limit for the pixel spacing of said image sensor.

14. The method as defined by claim 12, where said step of providing a lens array comprises providing a copy lens array, and said step of providing an aperture comprises providing said aperture within said copy lens array.

15. The method as defined by claim 12, further including recording, on an object film, images represented by said electronic signals, said recording including the steps of:
   providing a further light source;
   providing an electro-optical medium that receives image-representative electronic signals and also receives input light from the further light source, and produces output light containing the image represented by said electronic signals;
   providing a lens array for projecting said output light onto said object film, and providing a further aperture in conjunction with said lens array for high spatial frequency cutoff in the image.

16. The method as defined by claim 1, wherein said step of illuminating said film with a light source comprises providing a laser beam and a beam expander.

17. The method as defined by claim 1, where said step of providing a lens array comprises providing a copy lens array, and said step of providing an aperture comprises providing said aperture within said copy lens array.

18. The method as defined by claim 1, further comprising the step of storing said image-representative signals.

19. The method as defined by claim 1, wherein said step of illuminating said film with a light source comprises illuminating said film sequentially with different colored light.

20. The method as defined by claim 1, further including recording, on an object film, images represented by said electronic signals, said recording including the steps of:
   providing a further light source;
   providing an electro-optical medium that receives image-representative electronic signals and also receives input light from the further light source, and produces output light containing the image represented by said electronic signals;
   providing a further lens array for projecting said output light onto said object film, and providing a further aperture in conjunction with said lens array for high spatial frequency cutoff in the image.

21. The method as defined by claim 20, wherein said step of providing an electro-optical medium comprises providing an electro-optical panel.

22. The method as defined by claim 21, wherein said step of providing an electro-optical panel comprises providing a liquid crystal panel.

23. The method as defined by claim 21 wherein said step of providing a further aperture comprises providing an aperture having a shape matched to the pixel pattern of said electro-optical panel.

24. The method as defined by claim 20, further comprising focusing the image of the light source at the plane of said aperture, said image of the light source being less than one-fifth the size of said aperture.

25. The method as defined by claim 20, wherein said step of providing a further aperture comprises providing a rectangular aperture.

26. The method as defined by claim 20, wherein said step of providing a further aperture comprising providing a square aperture.

27. The method as defined by claim 20, wherein said step of providing a further aperture comprises providing a hexagonal aperture.

28. The method as defined by claim 20, wherein said step of providing a further aperture comprises providing a diamond shaped aperture.

29. The method as defined by claim 20, wherein said step of providing a further aperture comprises providing an aperture having a high frequency cutoff in the range 0.7 to 1.4 times the Nyquist limit for the pixel spacing of said electro-optical panel.

30. The method as defined by claim 20, further comprising the step of adjusting the size of said further aperture.

31. The method as defined by claim 20, where said step of providing a further lens array comprises providing a camera lens array, and said step of providing a further aperture comprises providing said aperture within said further copy lens array.

32. The method as defined by claim 20, wherein said step of providing a further light source comprises providing, sequentially, different colored light sources.

33. A method for recording, on an object film, images represented by electronic signals, comprising the steps of:
   providing a light source;
   providing an electro-optical panel that receives image-representative electronic signals and also receives input light from the light source, and produces output light containing the image represented by said electronic signals;
   providing a lens array for projecting said output light onto said object film, and providing an aperture in conjunction with said lens array for high spatial frequency cutoff in the image, said aperture having a shape matched to the pixel pattern of said electro-optical panel.

34. The method as defined by claim 33, wherein said step of providing an electro-optical panel comprises providing a liquid crystal panel.

35. The method as defined by claim 33, further comprising focusing the image of the light source at the plane of said aperture, said image of the light source being less than one-fifth the size of said aperture.

36. The method as defined by claim 35, wherein said step of focusing the image of said light source comprises focusing with a field lens.

37. The method as defined by claim 35, wherein said step of providing an aperture comprises providing an aperture having a high frequency cutoff in the range 0.7 to 1.4 times the Nyquist limit for the pixel spacing of said electro-optical panel.

38. The method as defined by claim 35, further comprising the step of adjusting the size of said aperture.

39. The method as defined by claim 35, where said step of providing a lens array comprises providing a camera lens array, and said step of providing an aperture comprises providing said aperture within said camera lens array.

40. The method as defined by claim 33, wherein said step of providing an aperture comprises providing a rectangular aperture.

41. The method as defined by claim 33, wherein said step of providing an aperture comprising providing a square aperture.

42. The method as defined by claim 33, wherein said step of providing an aperture comprises providing a hexagonal aperture.

43. The method as defined by claim 33, wherein said step of providing an aperture comprises providing a diamond shaped aperture.

44. The method as defined by claim 33, wherein said step of providing an aperture comprises providing an aperture having a high frequency cutoff in the range 0.7 to 1.4 times the Nyquist limit for the pixel spacing of said electro-optical panel.

45. The method as defined by claim 33, further comprising the step of adjusting the size of said aperture.

46. The method as defined by claim 33, wherein said step of providing a light source comprises providing a laser beam and a beam expander.

47. The method as defined by claim 33, where said step of providing a lens array comprises providing a camera lens array, and said step of providing an aperture comprises providing said aperture within said camera lens array.

48. The method as defined by claim 33, wherein said step of providing a light source comprises providing, sequentially, different colored light sources.

49. Apparatus for producing electronic signals representative of images on a source film, comprising the steps of:
  means for illuminating said film with a light source to obtain an illuminated frame;
  an electronic image sensor;
  a lens array for projecting said illuminated frame on said electronic image sensor, and an aperture in conjunction with said lens array for implementing high spatial frequency cutoff in the image, said aperture having a shape matched to the pixel pattern of said image sensor; and
  means for reading out image representative electronic signals from said electronic image sensor.

50. Apparatus as defined by claim 49, further comprising means for focusing the image of the light source at the plane of said aperture, said image of the light source being less than one-fifth the size of said aperture.

51. Apparatus as defined by claim 50, wherein said focusing means comprises a field lens.

52. Apparatus as defined by claim 50, wherein said step aperture has a high frequency cutoff in the range 0.7 to 1.4 times the Nyquist limit for the pixel spacing of said image sensor.

53. Apparatus as defined by claim 50, where said lens array comprises a copy lens array, and said aperture is disposed within said copy lens array.

54. Apparatus for recording, on an object film, images represented by electronic signals, comprising:
  a light source;
  an electro-optical panel that receives image-representative electronic signals and also receives input light from the light source, and produces output light containing the image represented by said electronic signals; and
  a lens array for projecting said output light onto said object film, and an aperture in conjunction with said lens array for high spatial frequency cutoff in the image, said aperture having a shape matched to the pixel pattern of said electro-optical panel.

55. Apparatus as defined by claim 54, wherein said electro-optical panel comprises a liquid crystal panel.

56. Apparatus as defined by claim 54, further comprising means for focusing the image of the light source at the plane of said aperture, said image of the light source being less than one-fifth the size of said aperture.

57. Apparatus as defined by claim 56, wherein said means for focusing the image of the light source comprises a field lens.

58. Apparatus as defined by claim 56, wherein said aperture has a high frequency cutoff in the range 0.7 to 1.4 times the Nyquist limit for the pixel spacing of said electro-optical panel.

59. Apparatus as defined by claim 56, wherein said light source comprises a laser beam and a beam expander.

60. Apparatus as defined by claim 56, where said lens array comprises a camera lens array, and said aperture is disposed within said camera lens array.

61. A method for producing electronic signals representative of images on a source film, comprising the steps of:
  illuminating said film with a light source to obtain an illuminated frame;
  providing an electronic image sensor;
  providing a lens array for projecting said illuminated frame on said electronic image sensor, and providing an aperture in conjunction with said lens array for high spatial frequency cutoff in the image, said aperture having a shape matched to the pixel pattern of said image sensor; and
  reading out image representative electronic signals from said electronic image sensor.

62. The method as defined by claim 61, further comprising focusing the image of the light source at the plane of said aperture, said image of the light source being less than one-fifth the size of said aperture.

63. The method as defined by claim 61, wherein said focusing step comprises focusing with a field lens.

64. The method as defined by claim 61, wherein said step of providing an aperture comprises providing a rectangular aperture.

65. The method as defined by claim 61, wherein said step of providing an aperture comprising providing a square aperture.

66. The method as defined by claim 61, wherein said step of providing an aperture comprises providing a hexagonal aperture.

67. The method as defined by claim 61, wherein said step of providing an aperture comprises providing a diamond shaped aperture.

68. The method as defined by claim 61, wherein said step of providing an aperture comprises providing an aperture having a high frequency cutoff in the range 0.7 to 1.4 times the Nyquist limit for the pixel spacing of said image sensor.

69. The method as defined by claim 61, further comprising the step of adjusting the size of said aperture.

70. The method as defined by claim 61, further including recording, on an object film, images represented by said electronic signals, said recording including the steps of:
  providing a further light source;
  providing an electro-optical medium that receives image-representative electronic signals and also receives input light from the further light source, and produces output light containing the image represented by said electronic signals;
  providing a further lens array for projecting said output light onto said object film, and providing a further aperture in conjunction with said lens array for high spatial frequency cutoff in the image.

71. The method as defined by claim 70, wherein said step of providing an electro-optical medium comprises providing an electro-optical panel.

72. The method as defined by claim 71, wherein said step of providing a further aperture comprises providing an aperture having a shape matched to the pixel pattern of said electro-optical panel.

* * * * *